(12) United States Patent
     Cao

(10) Patent No.:     US 12,639,910 B2
(45) Date of Patent:          May 26, 2026

(54) DETECTION OF IMAGE SHARPNESS IN FREQUENCY DOMAIN

(71) Applicant: CANON U.S.A., INC., Melville, NY (US)

(72) Inventor: Xiwu Cao, Arcadia, CA (US)

(73) Assignee: Canon U.S.A., Inc., Melville, NY (US)

( * ) Notice: Subject to any disclaimer, the term of this patent is extended or adjusted under 35 U.S.C. 154(b) by 410 days.

(21) Appl. No.: 18/035,665

(22) PCT Filed: Nov. 8, 2021

(86) PCT No.: PCT/US2021/058425
     § 371 (c)(1),
     (2) Date: May 5, 2023

(87) PCT Pub. No.: WO2022/099118
     PCT Pub. Date: May 12, 2022

(65) Prior Publication Data
     US 2023/0401813 A1      Dec. 14, 2023

Related U.S. Application Data

(60) Provisional application No. 63/111,315, filed on Nov. 9, 2020.

(51) Int. Cl.
     G06V 10/32          (2022.01)
     G06V 10/25          (2022.01)
     (Continued)

(52) U.S. Cl.
     CPC ........... G06V 10/431 (2022.01); G06V 10/25 (2022.01); G06V 10/32 (2022.01); G06V 10/993 (2022.01); G06V 20/70 (2022.01)

(58) Field of Classification Search
     CPC .................. G06V 10/32; G06V 10/993; G06T 2207/20052; G06T 2207/30168
     See application file for complete search history.

(56) References Cited

U.S. PATENT DOCUMENTS 7,181,082 B2 *  2/2007  Feng ......................... G06T 5/10
                                                       382/263
7,764,844 B2 *  7/2010  Bouk .................... G06T 7/0004
                                                       382/250

(Continued)

FOREIGN PATENT DOCUMENTS

KR      10-2019-0056009 A      5/2019
KR          10-1993010 B1      6/2019

(Continued)

OTHER PUBLICATIONS

A. Saha and Q. M. J. Wu, "Utilizing Image Scales Towards Totally Training Free Blind Image Quality Assessment," in IEEE Transactions on Image Processing, vol. 24, No. 6, pp. 1879-1892, Jun. 2015, doi: 10.1109/TIP.2015.2411436. (Year: 2015).*

(Continued)

*Primary Examiner* — Michael Robert Cammarata
(74) *Attorney, Agent, or Firm* — Canon U.S.A., Inc., IP Division

(57)          ABSTRACT

An image processing apparatus and method are provided which obtains an image captured by an image capture device and stored in a memory, extracts one or more regions of interest in the obtained image, normalizes the extracted one or more regions of interest to be at a same scale or some predefined scales, extract the frequency information of regions of interest, determines a sharpness of the obtained image by aggregating the frequency information in each of the one or more extracted regions of interest, and labels the obtained image with the determined sharpness score.

14 Claims, 11 Drawing Sheets

(51) Int. Cl.
    *G06V 10/42*       (2022.01)
    *G06V 10/98*       (2022.01)
    *G06V 20/70*       (2022.01)

(56)           References Cited

U.S. PATENT DOCUMENTS

| | | | |
|---|---|---|---|
| 8,358,877 | B2 | 1/2013 | Noguchi |
| 8,395,708 | B2 | 3/2013 | Lee et al. |
| 9,251,439 | B2 * | 2/2016 | Hong .................... G06T 7/0002 |
| 10,075,737 | B2 | 9/2018 | Ayzenberg |
| 10,140,544 | B1 | 11/2018 | Zhao et al. |
| 10,515,443 | B2 | 12/2019 | Shen et al. |
| 10,796,200 | B2 | 10/2020 | Sutic et al. |
| 2012/0275671 | A1 * | 11/2012 | Eichhorn ............... H04N 19/60 382/128 |
| 2013/0083205 | A1 * | 4/2013 | Gamadia .............. H04N 17/002 348/188 |
| 2013/0315499 | A1 * | 11/2013 | Ju .......................... H04N 23/64 382/255 |
| 2014/0355881 | A1 * | 12/2014 | Bhardwaj ............. G06T 7/0002 382/173 |
| 2016/0295098 | A1 * | 10/2016 | Li ........................... G06T 7/571 |
| 2019/0171908 | A1 | 6/2019 | Salavon |
| 2019/0197362 | A1 * | 6/2019 | Campanella ........... G06V 10/30 |
| 2020/0265220 | A1 | 8/2020 | Zhang et al. |
| 2020/0273155 | A1 * | 8/2020 | Kawabata ............. G06T 7/0002 |
| 2024/0087097 | A1 * | 3/2024 | Shi ....................... G06V 40/166 |

FOREIGN PATENT DOCUMENTS

| | | | | |
|---|---|---|---|---|
| KR | 10-2131273 | B1 | 8/2020 | |
| KR | 10-2140805 | B1 | 8/2020 | |
| KR | 10-2170620 | B1 | 10/2020 | |
| KR | 102254198 | B1 * | 5/2021 | ............... G06T 5/50 |

OTHER PUBLICATIONS

Z. Zhang, Y. Liu, Z. Xiong, J. Li and M. Zhang, "Focus and Blurriness Measure Using Reorganized DCT Coefficients for an Autofocus Application," in IEEE Transactions on Circuits and Systems for Video Technology, vol. 28, No. 1, pp. 15-30, Jan. 2018, doi: 10.1109/TCSVT.2016.2602308. (Year: 2018).*

A. Balanov, A. Schwartz, Y. Moshe and N. Peleg, "Image quality assessment based on DCT subband similarity," 2015 IEEE International Conference on Image Processing (ICIP), Quebec City, QC, Canada, 2015, pp. 2105-2109, doi: 10.1109/ICIP.2015.7351172. (Year: 2015).*

L. Li, W. Xia, W. Lin, Y. Fang and S. Wang, "No-Reference and Robust Image Sharpness Evaluation Based on Multiscale Spatial and Spectral Features," in IEEE Transactions on Multimedia, vol. 19, No. 5, pp. 1030-1040, May 2017, doi: 10.1109/TMM.2016. 2640762. (Year: 2017).*

H. Kim, J. Kim, T. Oh and S. Lee, "Blind Sharpness Prediction for Ultrahigh-Definition Video Based on Human Visual Resolution," in IEEE Transactions on Circuits and Systems for Video Technology, vol. 27, No. 5, pp. 951-964, May 2017, doi: 10.1109/TCSVT.2016. 2515303. (Year: 2017).*

A. Mittal, A. K. Moorthy and A. C. Bovik, "No-Reference Image Quality Assessment in the Spatial Domain," in IEEE Transactions on Image Processing, vol. 21, No. 12, pp. 4695-4708, Dec. 2012, doi: 10.1109/TIP.2012.2214050. (Year: 2012).*

Li, L., et al., "No-Reference and Robust Image Sharpness Evaluation Based on Multiscale Spatial and Spectral Features", IEEE Transactions on Multimedia, May 2017, pp. 1030-1040, vol. 19, No. 5.

* cited by examiner (A) blur image (B) sharp image (C) Intensity profiles on the same horizatal line
from the blur and sharp images

DETECTION OF IMAGE SHARPNESS IN FREQUENCY DOMAIN

CROSS-REFERENCE TO RELATED APPLICATIONS

This application is a National Phase application of International Application No. PCT/US2021/058425, filed Nov. 8, 2021, which claims the benefit of priority from U.S. Provisional Patent Application Ser. No. 63/111,315 filed on Nov. 9, 2020, the entirety of both applications are hereby incorporated by reference.

BACKGROUND

Field

The present disclosure relates to an improvement in an image processing method.

Description of Related Art

There are many approaches available to detect the sharpness of an image. Some are based on the measurements of the features in spatial domain, including derivative of intensities, width of edges, variance of intensities, or histogram of intensity. Others are based on the features in frequency domain, like power spectrum, discrete cosine transform, or wavelet based techniques.

Although the frequency information of an image has been well used to evaluate the sharpness of an image, particularly in finding the best one from a sequence of continuously shooting images, its effectiveness generally requires all the images have similar camera setting environments, including their lighting, image size, sensor resolution. Otherwise, we might not be able to relate their frequency information to the sharpness perception successfully.

SUMMARY

An image processing apparatus and method are provided which obtains an image captured by an image capture device and stored in a memory, extracts one or more regions of interest in the obtained image, normalizes the extracted one or more regions of interest to be at a same scale or some predefined scales, extract the frequency information of regions of interest, determines a sharpness of the obtained image by aggregating the frequency information in each of the one or more extracted regions of interest, and labels the obtained image with the determined sharpness score.

In another embodiment, the image processing apparatus and method generates a patch region having a predetermined size, determines a stride size based on a size of the patch region and scale achieved during normalization and moves the generated patch region according to the stride size to determine the intensity values and the frequency information in each of the one or more extracted regions.

In another embodiment, the image processing apparatus and method selecting, for the generated patch, a ratio of frequencies in an X direction and a Y direction to identify a first region of the patch having lowest frequencies in both the X and Y direction to identify a second region of the patch having highest frequencies in just the X direction, just the Y direction and both the X and Y direction and calculate one or more region scores using the frequency information in the first region, and one or more region scores using the frequency information in second region. Frequency information includes one or more of a mean value of frequency information and one or more of a maximum value of frequency information for each of the first region and the second region.

In another embodiment, the image processing apparatus and method uses a plurality scales to obtain information from neighboring pixels for the generated patch such that each scale evaluates an increased number of neighboring pixels in the generated patch. In so doing, selects a subset of scales from the plurality of scales and obtains frequency information about the image data from the pixels included in the selected subset of scales. Furthermore, the frequency information from each of the plurality of scales to is used to predict sharpness of the obtained image.

These and other objects, features, and advantages of the present disclosure will become apparent upon reading the following detailed description of exemplary embodiments of the present disclosure, when taken in conjunction with the appended drawings, and provided claims.

Figure 1:
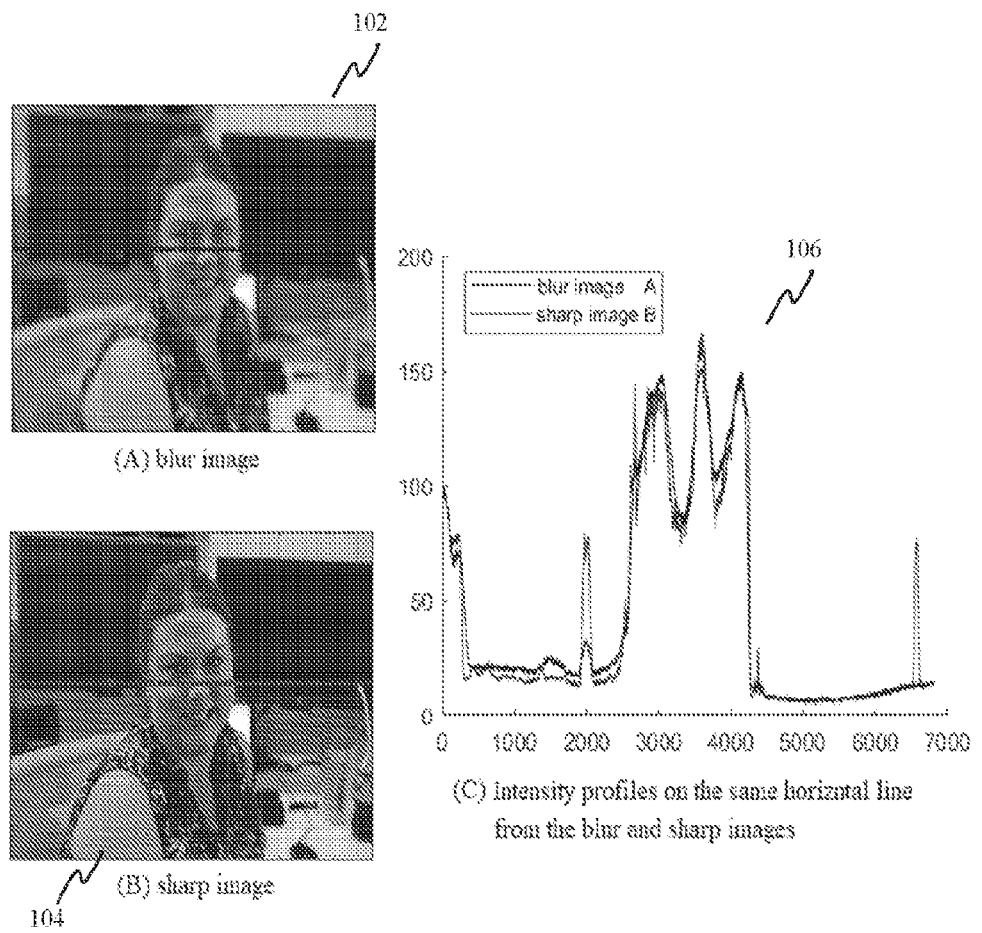
FIG. 1 are images illustrating sharpness comparison.

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

DETAILED DESCRIPTION

Throughout the figures, the same reference numerals and characters, unless otherwise stated, are used to denote like features, elements, components or portions of the illustrated embodiments. Moreover, while the subject disclosure will now be described in detail with reference to the figures, it is done so in connection with the illustrative exemplary embodiments. It is intended that changes and modifications can be made to the described exemplary embodiments without departing from the true scope and spirit of the subject disclosure as defined by the appended claims.

Exemplary embodiments of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment and, according to the Figures and embodiments described below, embodiments described can be applied/performed in situations other than the situations described below as examples.

Sharpness is an important factor in image quality assessment. It is often used to search for best shot from a sequence of similar images, or provide feedback during the image capture process. Generally, the sharpness of an image is influenced by many factors including but not limited to, camera lens, sensor, focus/defocus, lighting, camera stability/shake, or camera motion. There are many approaches available to detect the sharpness of image. Some are based on the measurements of the features in spatial domain, including derivative of intensities, width of edges, variance of intensities, or histogram of intensity. Others are based on the features in frequency domain, like power spectrum, discrete cosine transform, or wavelet based techniques.

According to the present disclosure, a novel technique is provided which evaluates the sharpness of an image in frequency domain. The technique described is particularly advantageous for evaluating sharpness of a particular object in an image such as a face of human in an image, but the principle also applicable to other objects like the natural scenes and any non-face object in an image.

Sharpness is generally related to the amount of details within an image. One example is shown in FIG. 1. A first image 102 and a second image 104 are shown in FIG. 1. The second image 104 is perceived to have a higher sharpness than the first image 102. This perception can be verified by drawing a horizontal line in the same position on both the first image 102 and second image 104. Their intensity profiles are shown in the graph 106. As can been seen, the intensity profile in the second image 104 has more details than the intensity profile associated with the first image 102. This "more details" can be estimated using their frequency information.

In one embodiment, the algorithm extracts the frequency information of an image using its Discrete Cosine Transform (DCT). In an exemplary embodiment, the frequency information is exacted according to DCT IT. Mathematically, DCT II in two-dimensional space is defined in Equation 1 as follows:

$$X_{k_1,k_2} = \sum_{n_1=0}^{N_1-1} \left( \sum_{n_2=0}^{N_2-1} x_{n_1,n_2} \cos\left[\frac{\pi}{N_2}\left(n_2 + \frac{1}{2}\right)k_2\right]\right) \cos\left[\frac{\pi}{N_1}\left(n_1 + \frac{1}{2}\right)k_1\right] \tag{1}$$

where, $x_{n_1,n_2}$ is the pixel intensity at spatial position $(n_1, n_2)$, $N_1$ and $N_2$ define the spatial region used to estimate the frequency magnitude at frequency position $(k_1, k_2)$, or $X_{k_1,k_2}$ here.

Figure 2:
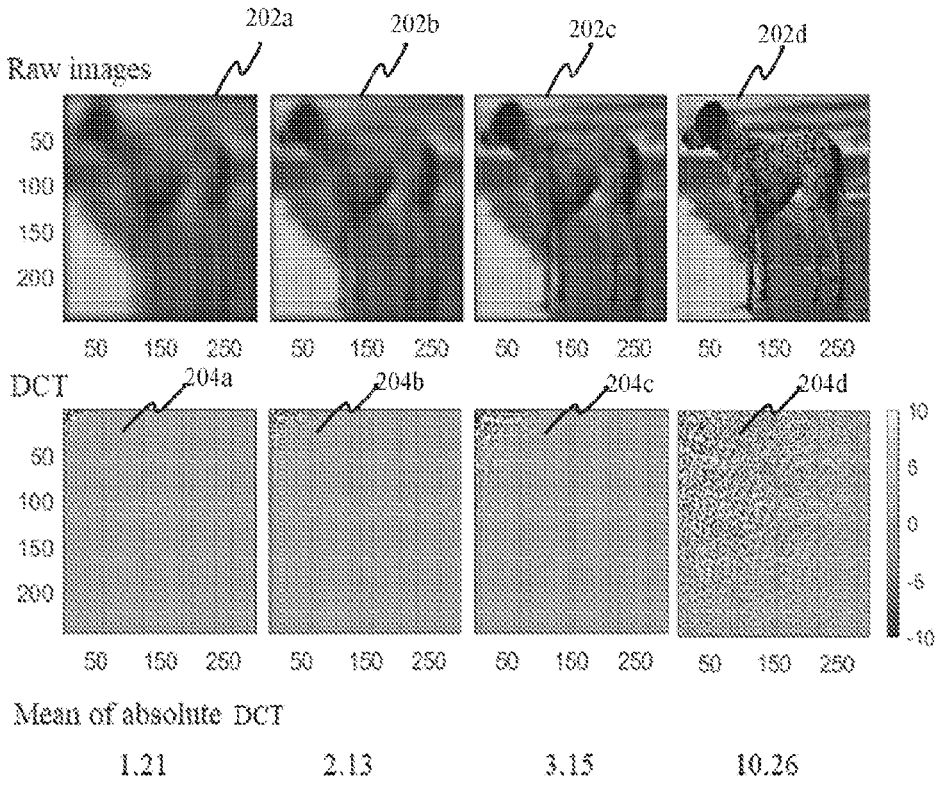
FIG. 2 are images and their associated DCT transforms.

A sequence of four images 202a-202d characterized as blurry to sharp and the DCT transform 204a-204d associated with respective image 202a-202d is shown in FIG. 2. As shown therein the sharper an image is, the higher the absolute of its DCT values. Furthermore, if the mean of their absolute values on four images is estimated, they are 1.21, 2.13, 3.15, and 10.26, respectively. As such, the DCT values are substantially proportional to the perceived sharpness of the images. The correlation between the perceived sharpness from the images and the mean absolute value of the DCT transform illustrates the ability to use the frequency information to evaluate the sharpness score of an image. Note that DCT transform could be negative, thus we need to get their absolute value before estimating the mean.

Figure 3:
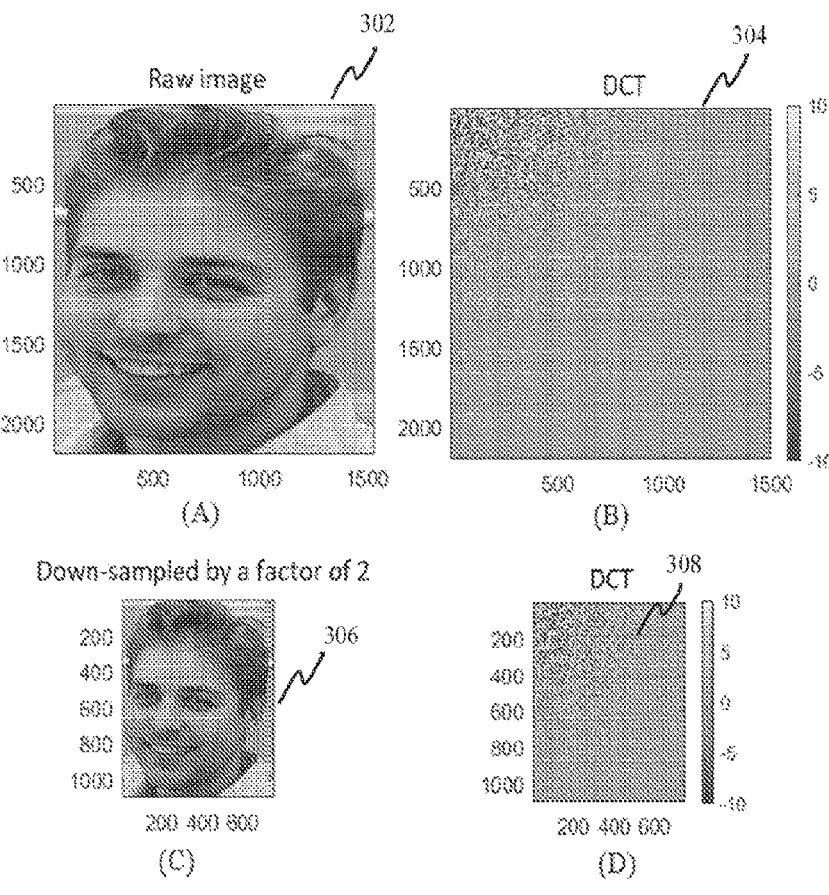
FIG. 3 are images and their associated DCT transforms.

Although DCT is good to evaluate the magnitude of the frequency information, we cannot directly take the frequency magnitude as the sharpness score in view of the inconsistence illustrated in FIG. 3. FIG. 3 shows two images of a same face and the associated DCT transforms. The first image 302 has an associated DCT transform 304 while the second image 306 has its associated DCT transform 308. The scond image 306 is substantailly similar to the first image image 302 but down-sampled by a factor of 2. Since the second image 306 is down-sampled from the first image 308, it is impossible that the perceived sharpness of the second image 306 is larger than the perceived sharpness of the first image 302. However, if we check the values of the DCT transform 304 for the first image 106 and DCT transofm 308 of the second image 306, the absolute mean values are respectively 2.97 and 4.57, which means the sharpness of the second image 306 would be higher than the sharpness of the first image 302 if we only used their DCT frequency magnitude as the sharpness score. Thus, the characterization of sharpness using only DCT transforms yields an incorrect characterization.

The main reason for the higher DCT score and thus mischaracterization in the down-sampled image is that the down-sampled image has a sampling rate which is different from the original one, causing an inconsistency in the ultimate evaluation. More specifically, this inconsistency results in the inability to evaluate the frequeny information in terms of the same range. In order to compare them directly, a resize operation on the image needs to be performed such that both images have a same frequency scale.

Generally, an image contains multiple objects. Each object has a different size and in order to obtain their frequency magnitude to evaluate their sharpness, the different objects need to be aligned into a common evaluation system.

The following manner of scaling each of the different sized objects will be described with respect to an object in an image being a human face. By using the face image, it and other objects can be scaled place into a common frequency evaluation system. Initially, the algorithm obtains (or determines) a resolution or sampling rate used for a face. Too large resolution results in large and unnecessary memory usage and could reduce the processing speed. Too small resolution is also not desirable because it may cause too many critical details to be lost resulting in the inability to differentiate sharpness.

Figure 4:
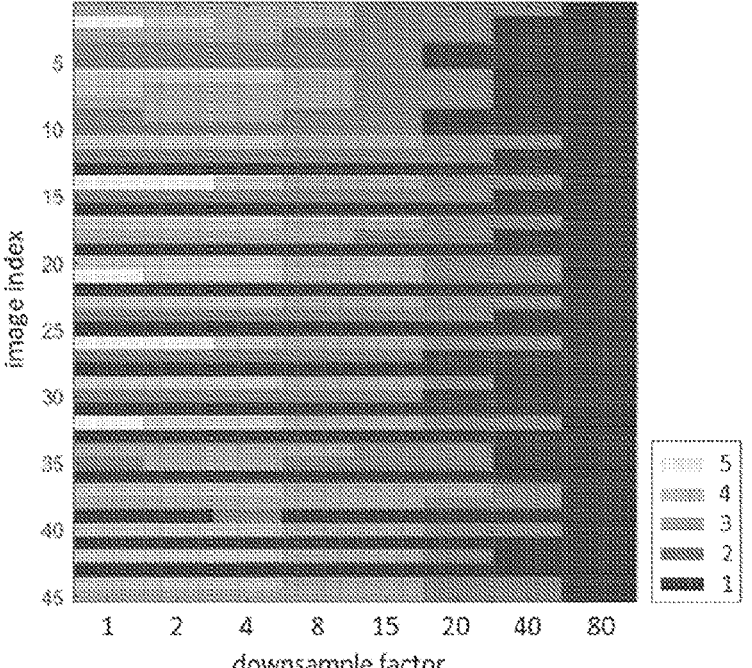
FIG. 4 is a graphical depiction of sharpness scores for images.

A minimum resolution for a face is determined based on training data whereby predetermined number of images with face objects were selected. A predetermined number of different down-sampling factors were applied to down-sample the images into different scales. In one embodiment, the predetermined number may be 8 different down-sampling scales, such as 1, 2, 4, 8, 15, 20, 40, and 80. These scales are applied to down-sample the images into eight different scaled images. Each different group were then evaluated by an expert was to evaluate the sharpness and generate a score of the face in each image. The score goes from 1 to 5 with 1 representing 'very blurry' and 5 representing 'very sharp'. The results are shown in FIG. 4.

It was determined that when the down-sample factor is 8 or higher, the resulting score 4 or more were rare. Further, when the down-sample factor is 80 or more, almost all faces had a score of 1. By collecting all the faces that had scores of 4 or 5, it was determined that minimum number of pixels for a face to be possible to get a score of 5 with some redundancy, we need at least 120000 pixels. Given the ratio between the height and width of a face is around 1.35, the minimum face resolution we estimated here is about 300 by 400. To further allow for redundancy, the maximum pixel resolution used is 1000 by 1000.

Figures 5, 6:
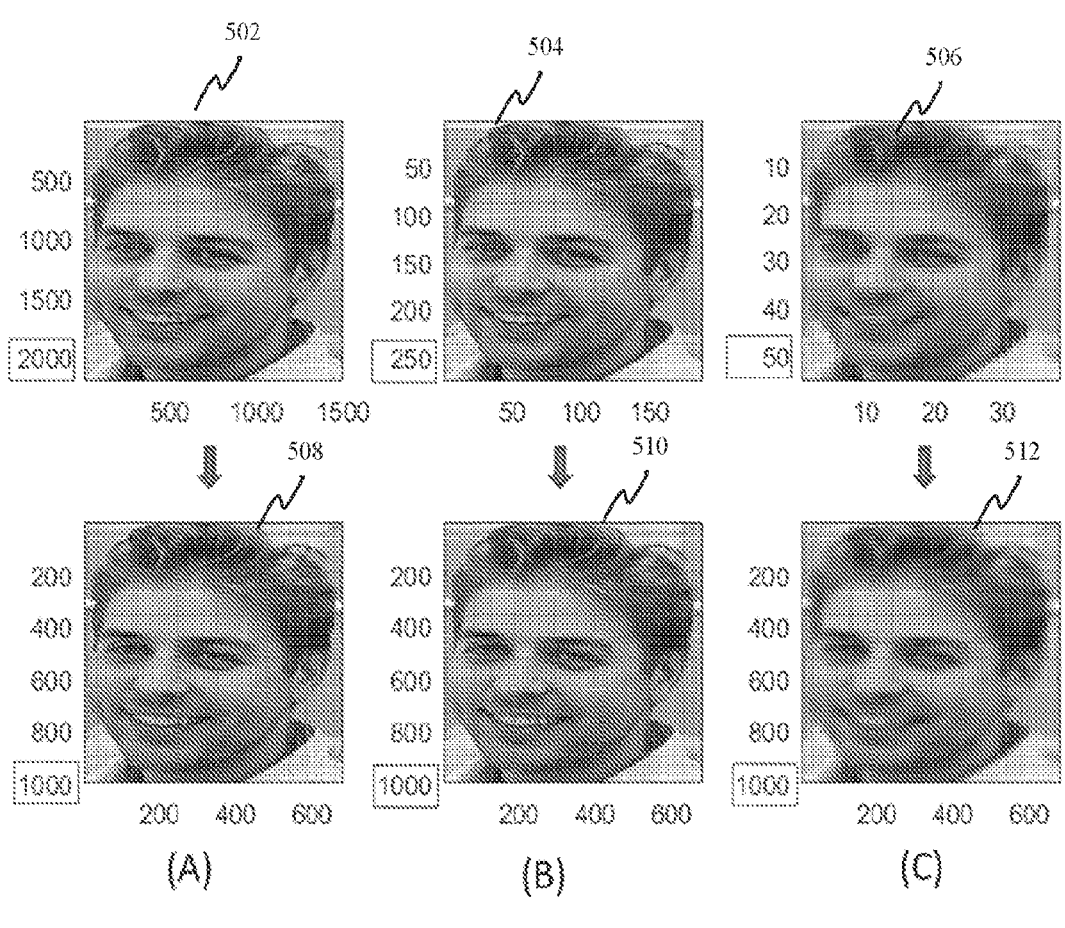
FIG. 5 illustrate different images being scaled to a same resolution.
FIG. 6 is a graphical depiction of a DCT transform patch score.

In FIG. 5, images of the same face at different resolutions is shown. FIG. 5 includes a first image 502 with a first resolution of 2200×1500, a second image 504 with a second resolution 275×188 and a third image 506 with a third resolution 55×38. Also shown in FIG. 5, directly below each image are their scaled images which represent the respective image either down-sampled as in the case with image 502 or up-sampled as in the case with images 504 and 506. The first image 502 is down scaled and shown as image 508 while the second image 504 and third image 506 are upscaled and shown as images 510 and 512, respectively. After scaling, all the face images now have the same resolution of 1000×681. During the scaling process, it is important to keep the ratio between the height and the width during the scaling. Thus, when the length of one side, height or width, of a scaled face is 1000, the length of other side could be less than 1000.

Having properly determined the scale, it is possible to perform localized DCT transforms on multiple cropped patches in an image. The DCT transform illustrated in FIG. 2 and FIG. 3 are a global transformation on all the pixel intensities in an image. It represents the evaluation of frequency information at a scale of entire image. If there are any local sharp regions, their sharpness will be reduced due to the combination effect if we evaluate the frequency information at a scale of entire image.

One way to resolve this is to obtain enormous number local patches from the image. For example, for a face image of 1000 by 1000, if we select a patch size is 50 by 50 and a stride of 25, we are ending with 1521 local patches from the face. Each local patch is then evaluated based on their frequency information to obtain the local sharpness. Finally, all local sharpness scores are combined to estimate the sharpness of the entire face image.

One exemplary embodiment for evaluating sharpness of each local patch is shown in FIG. 6. For a given patch of predetermined number of pixels, the resulting DCT transform is also the same dimension. In one embodiment, a patch of 50 by 50 pixels is used resulting in its DCT transform also being 50 by 50. A predetermined ratio is used to segment each side in the X and Y direction to split the patch into four regions. In one embodiment, a ratio of 20 to 30 is used to split both sides at X and Y directions. The region labeled A in FIG. 6 stands for low frequency in both X and Y directions; the region labeled B stands for high frequency in X direction but low frequency in Y direction; the region labeled C stands for high frequency in Y direction but low frequency in X direction and the region labeled D stands for high frequency in both X and Y directions. Statistical numbers from these four regions are calculated to represent its frequency information. For example, we can use the average of the absolute DCT values for all frequencies located in B, C and D to represent its sharpness magnitude. In one embodiment, we obtain two parameters from this 50 by 50 DCT values. One is the average of frequency magnitudes in region A, which represents the low frequency information, and the other is the average of frequency magnitudes in regions of B, C and D, which represents the high frequency information.

A sample image with its DCT patch scores determined as described above is shown in FIG. 7. Image 702 represents a display of a full color, raw image having a resolution of 1083 by 1080. Image 704 depicts the resized image after being converted into grayscale and its resolution being scaled to a predetermined scaling resolution. As shown herein, the predetermined scaling resolution is 1000 by 997. Graph 706 represents the patch scores from the average of region A while graph 708 represents the patch scores from the average of regions B, C, and D. As shown herein the patch scores were evaluated using a patch size of 50 by 50 and a stride of 50, which gives us an array of 20 by 19 patches. This is described for purposes of example and the patch size can be any pixel dimension with the resulting array being dependent on the patch size used and in view of the resolution to which the image has been scaled.

Figure 7:
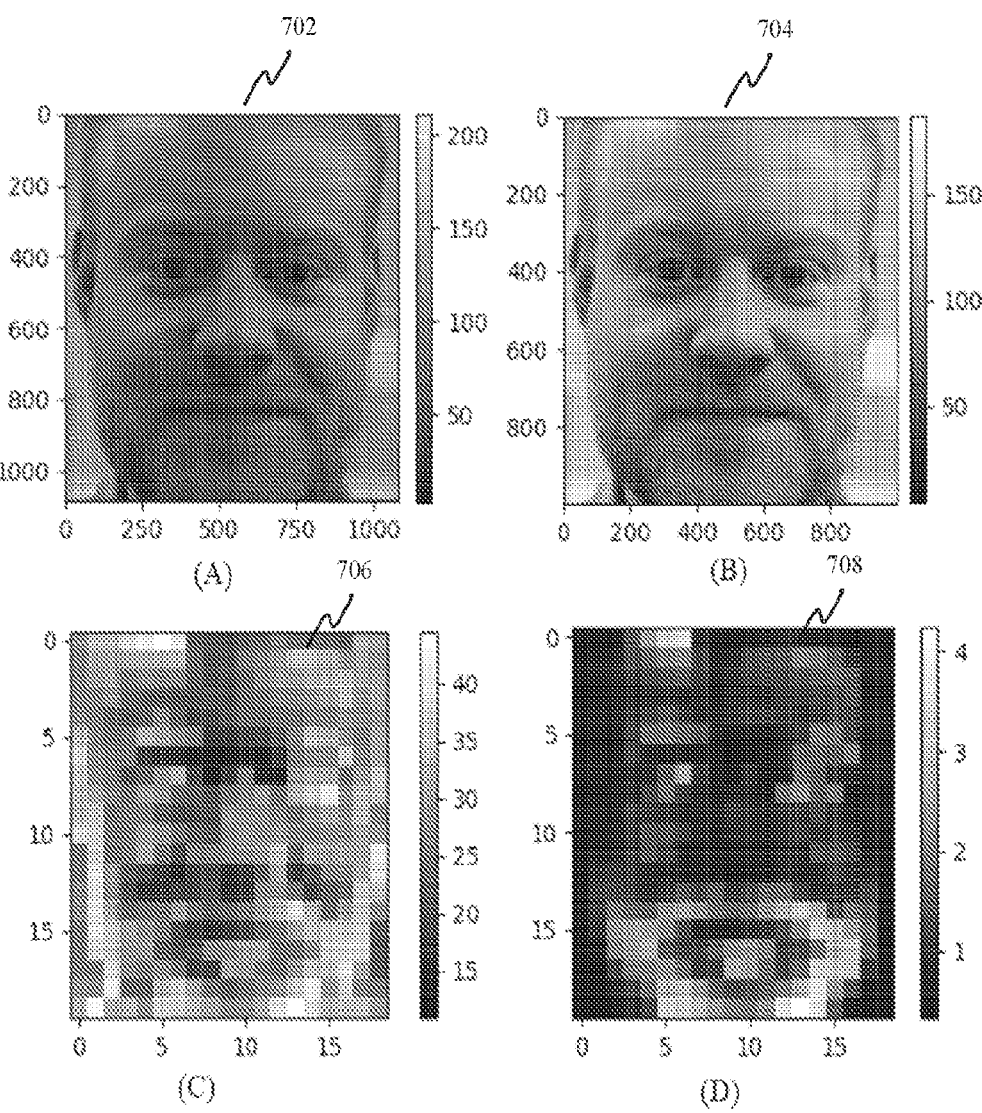
FIG. 7 is are images showing their DCT transform patch score.

For each patch score image in FIG. 7, the mean and max is calculated. So for each face, we are able to obtain four features here, i.e., the mean and the max of average scores from region A, and the mean and max of average scores from region B, C, and D. Using patches advantageously allows us to identify any local high frequency areas rather than have an aggregated overview of the frequency information on the entire image. However, a fixed patch size, such as 50 by 50 as was used earlier, is incapable of inspecting the frequency information at a larger scale.

Figure 8:
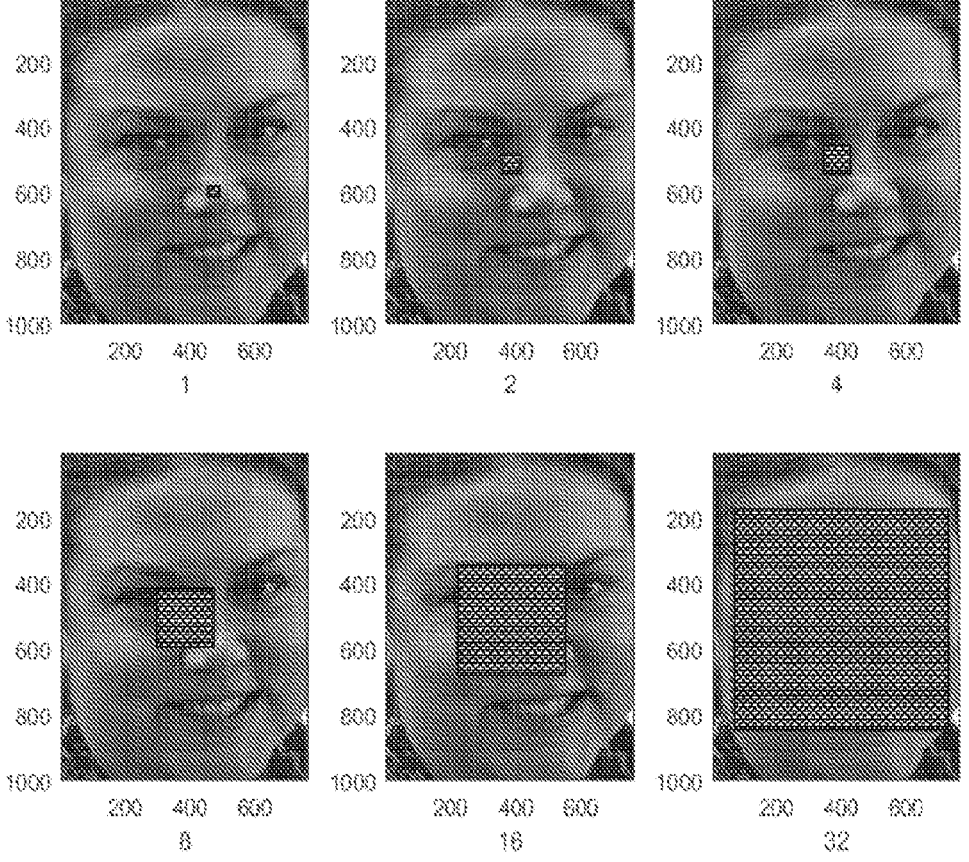
FIG. 8 are images illustrating multiple areas for selection based on the DCT patch score.

To tackle this incapability, multiple scales are used to generate patches having different dimensions. Six different scales, i.e., 1, 2, 4, 8, 16, 32, were applied when we generate the patch dimensions are determined. Scale 1 works as described earlier. For each selected pixel, we took a neighboring area of 50 by 50 to obtain the patch. For scale 2, we still took 50 by 50 in the neighboring area but sampled at every other pixel for each patch. Therefore, each patch we sampled covered double the length of scale 1 in both X and Y directions. Similarly, we sampled the neighboring area at every 4 pixels, 8 pixels, 16 pixels, and 32 pixels for scales of 4, 8, 16 and 32. An illustration of the sampling positions in the neighboring area for the same selected pixel are shown in FIG. 8. The star is the selected pixel position we want to evaluate the frequency in its neighboring area. Note that we used 21 by 21 dots here instead of 50 by 50 for better visualization.

Generally, in practice, not all scales illustrated here need to be used. Instead, the algorithm uses a predetermined number of the scales from them. For each scale, we can generate four feature parameters as showed in FIG. 7. Therefore, if we take scales of 1, 2, and 4, we can generate twelve feature parameters for each face. These twelve feature parameters will then be used in build a linear regression model that will be used in evaluating the sharpness of the image.

Figure 9:
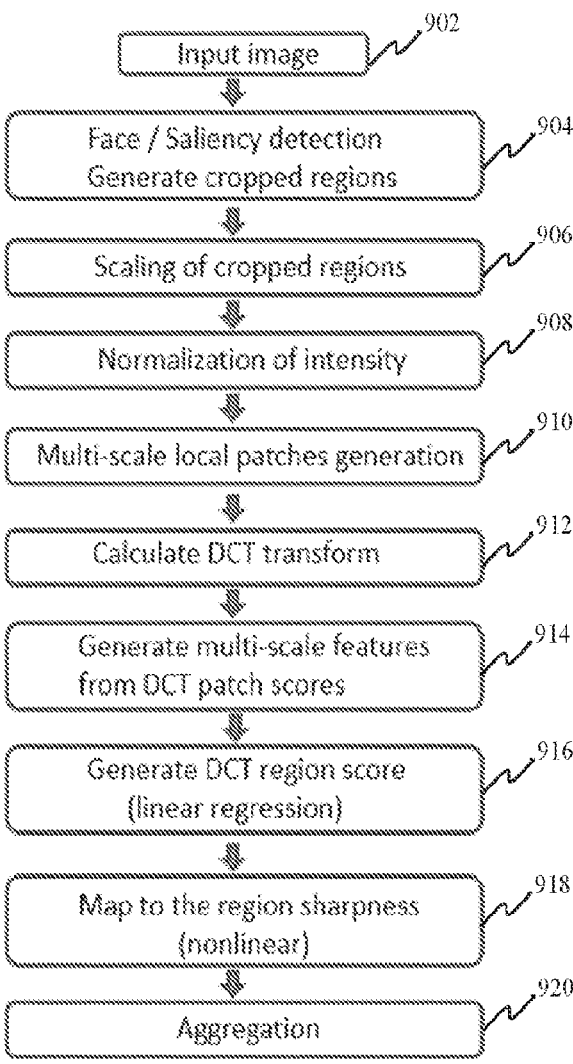
FIG. 9 is a flow diagram of a sharpness detection algorithm according to the present disclosure.

An exemplary sharpness evaluation algorithm is illustrated in FIG. 9 and it contains three stages. The first stage is the image preprocessing. In step 902 one or more images are obtained from a storage device such as memory on a smartphone or retrieved from a remote storage system such as a cloud service. In step 904, image pre-preprocessing performed is to detect objects and saliency regions. In one embodiment, an exemplary object detected is a face of human. In one embodiment, the entire image is not processed. Rather, the object and saliency detection is performed on regions that are of visual interest to a human. However, this is provided for purposes of example only and the entire image can be processed. Step 904 further results in the identification of face and saliency regions and generate bounding boxes therearound which are used to crop the image. In one embodiment, the cropped images were then be converted into a grayscale image, if needed.

Figure 10:
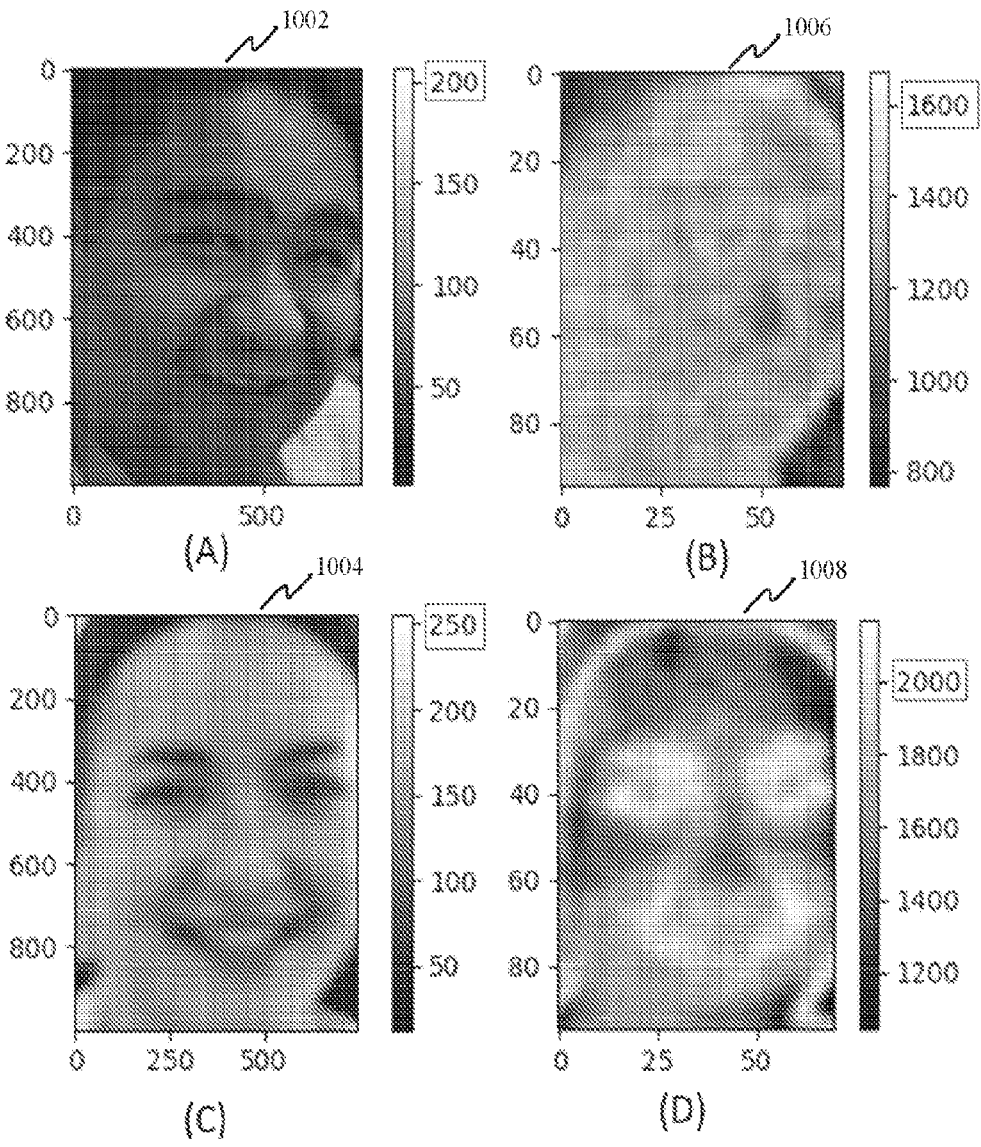
FIG. 10 are images that are processed according to the algorithm in FIG. 9.

In steps 906 and 908, each cropped region is scaled in the manner described above and normalized to have a similar lighting or mean intensity. The importance of normalizing the scaled cropped image data is illustrated in FIG. 10. Two cropped images 1002 and 1004 without the normalization of image intensity are shown in FIG. 10. Although image 1002 is sharper than image 1004, the DCT patch scores of image 1002, shown in graph 1006, is lower than the DCT patch scores of image 1004 shown in graph 1008. Note that the mean intensity of image 1002 is 71, but the mean intensity of image 1004 is 131. Thus, by normalizing the scaled images, a more truer DCT transform result is obtained.

Thereafter, in step 910, the algorithm removes the boundary region in any identified boxes. For example, the boundary area of a face often contains an intensity switch from face to the background. Depending on what background is placed in a cropped face image, it could contain very high frequency that however does not represent how sharp a face is. As such, it is removed. Local patches within the cropssed region from multi-scale sampling is generated as described above in FIG. 8. In one embodiment, all scales we mentioned in FIG. 8 are not used but a predetermined number of scales is used. For example, for an image of 1000 by 1000, if we use a patch size of 50 by 50, a stride of 50, and three scales of 1, 2, and 4, we will have a total of 525 patches, which includes 400 patches in scale 1, 100 patches in scale 2 and 25 patches in scale 4. This is described for purposes of example only and any number of scales can be used in this processing.

In step 912, using the processing described in FIG. 6 and FIG. 7, the DCT patch scores are obtained for the entire cropped image. Note that mirror pading should not be applied in patch generation, and also no further interpolation after we obtain the patch DCT scores. In step 914 a series of statistical numbers will be estimated based on the distribution of these patch scores. For example, in one embodiment, for each scale, we can extract four features from their DCT patches scores, including the mean and the max of the average of absolute DCT from regions A and the mean and the max of the average of absolute DCT from regions B, C and D. If we use three scales in our downsampling, we can generate twelve features for each face.

In step 916, since twelve features may be obtained for each face image, a predetermined number of images from each sharpness group are seleted and provided to a trained a linear regression model to output one DCT region score from these twelve DCT features. To avoid the inbalance between different groups, the number of images for each group should be close in size. The linear regression can be simply obtained by using the least square estimation on the extracted feaures and ground truth labelling. Some times, we also applied a logarithm before the linear mapping since we are able to obtain the better model performance with it. In step 918, a multi-segment linear function is used to map the final DCT score of a cropped image to its sharpness. Before obtaining the mapping function, a logarithm is applied because it enables the algorithm to obtain a better model performance.

Figure 11:
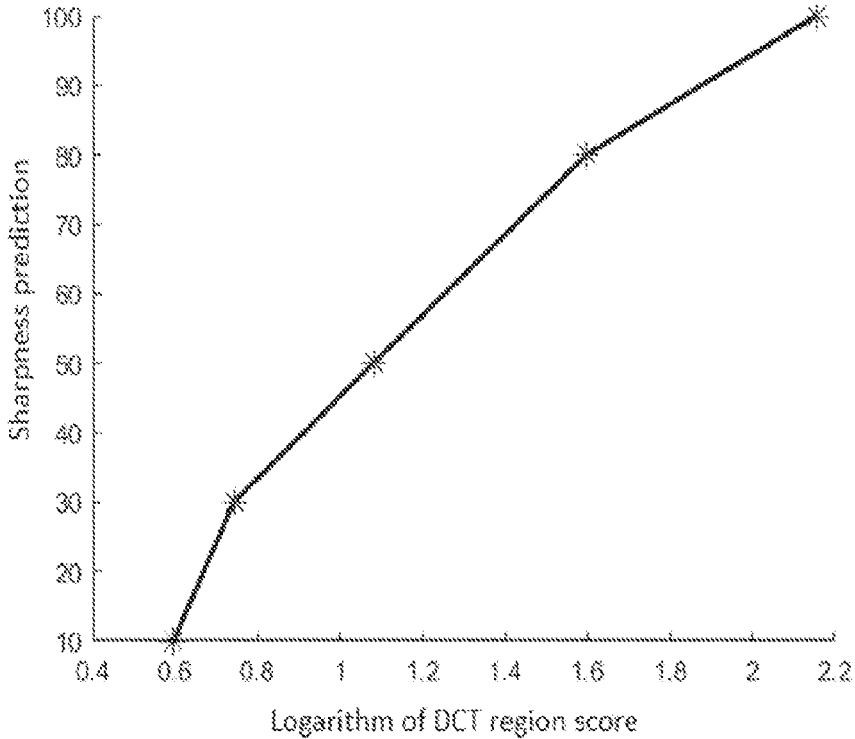
FIG. 11 is a graphical depiction mapping DCT region score to a sharpness score.

In step 920, to obtain this multi-segment linear function, all final DCT scores are collected and aggregated from all cropped images and divided them into five sharpness groups as illustrated in FIG. 4. A segment linear function was obtained to describe the relationship between any two neighboring sharpness groups, an example of which is illustrated in FIG. 11.

Figure 12:
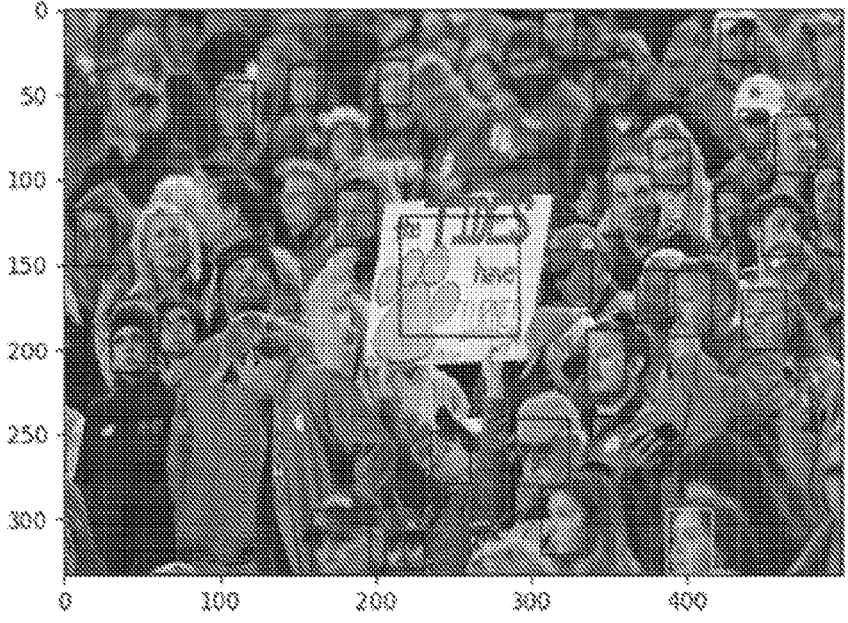
FIG. 12 is an image that are processed according to the algorithm in FIG. 9.

In an exemplary embodiment, a further aggregation step may be required if there are multiple cropped regions in an image such as shown in FIG. 12. In FIG. 12, there are substantially 31 possible cropped regions. In this case, the sharpness of the entire image should be obtained by taking into consideration all 31 regions. Examples of this includes but is not limited to obtaining the maximum score from the sharpness of maximum face, the sharpness of the face closest to the center, or the sharpness of the maximum saliency. While the above describes obtaining sharpness on one or more faces in an image, the above processing can be applied for non-face object using a different mapping function for non-face objects.

The algorithm according to the present disclosure provides clear advantages to existing algorithms using four performance evaluation metrics. These three algorithms include one from Android platform that used only the spatial features of an image, one from iOS platform that took only frequency features of an image, and one from cloud that combined both spatial and frequency features of an image. The four performance evaluation metrics are cross-correlation coefficients (CC), mean squared error (MSE), mean absolute error (MAE) and CPM (our data-dependent loss function). Our algorithm is proved better than all other three algorithms on each performance evaluation metric.

TABLE 1

| Comparison of our sharpness detection algorithm to three previous algorithms using four different metrics | | | | |
|---|---|---|---|---|
| | CC | MSE | MAE | CPM |
| Cloud | 0.29 | 0.32 | 0.27 | 0.35 |
| Android | 0.39 | 0.32 | 0.27 | 0.30 |
| IOS4 | 0.40 | 0.34 | 0.29 | 0.22 |
| Our algorithm | 0.57 | 0.22 | 0.19 | 0.74 |

The algorithm according to the present disclosure advantageously determine the minimum face resolution required to obtain a good sharpness detection, handles multi-scale frequency information using the same patch size, estimate the frequency information in a more consistent way and better connect the frequency information to the sharpness score of an image. The above is achieved by scaling images of different size into the same resolution, normalizing the image in terms of its mean intensities using different sampling strategies to handle different scales of frequency information use human evaluations to determine the minimum resolution for a face and apply a multi-segment linear function to map the raw DCT score into sharpness detection.

Figure 13:
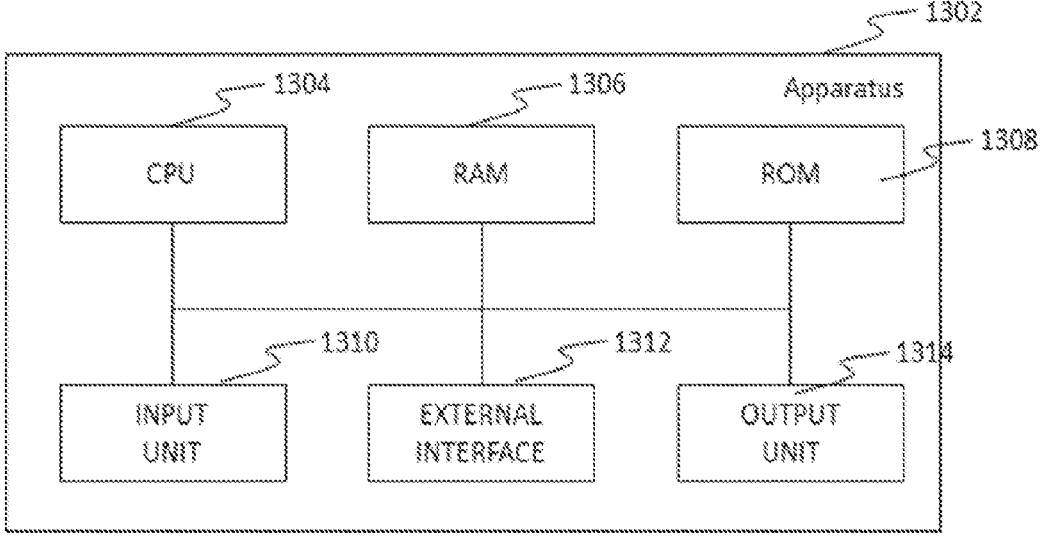
FIG. 13 is a block diagram detailing the hardware components of an apparatus that executes the algorithm according to the present disclosure.

FIG. 13 illustrates the hardware of an apparatus that can be used in implementing the above described disclosure. The apparatus 1302 includes a CPU 1304, a RAM 1306, a ROM 1308, an input unit 1310, an external interface 1312, and an output unit 1314. The CPU 1304 controls the apparatus 1302 by using a computer program (one or more series of stored instructions executable by the CPU) and data stored in the RAM 1306 or ROM 1308. Here, the apparatus may include one or more dedicated hardware or a graphics processing unit (GPU), which is different from the CPU 1304, and the GPU or the dedicated hardware may perform a part of the processes by the CPU 1304. As an example of the dedicated hardware, there are an application specific integrated circuit (ASIC), a field-programmable gate array (FPGA), and a digital signal processor (DSP), and the like. The RAM 1306 temporarily stores the computer program or data read from the ROM 1308, data supplied from outside via the external interface 1312, and the like. The ROM 1308 stores the computer program and data which do not need to be modified and which can control the base operation of the apparatus. The input unit 1310 is composed of, for example, a joystick, a jog dial, a touch panel, a keyboard, a mouse, or the like, and receives user's operation, and inputs various instructions to the CPU 1304. The external interface 1312 communicates with external device such as PC, smartphone, camera and the like. The communication with the external devices may be performed by wire using a local area network (LAN) cable, a serial digital interface (SDI) cable, WIFI connection or the like, or may be performed wirelessly via an antenna. The output unit 1314 is composed of, for example, a display unit such as a display and a sound output unit such as a speaker, and displays a graphical user interface (GUI) and outputs a guiding sound so that the user can operate the apparatus as needed.

According to the present disclosure, advantages of the custom generated loss function is provided by automatically obtaining and adjusting the loss function from the data which gives better interpretation about the model performance and reduces the negative impact associated with the inaccurate distance measurement in order to allow the model to not place too much weight on the outliers. The present disclosure achieves this advantage by designing individual loss functions for each class in a multiple class setting such that the loss function is based on the probability of real evaluation distribution and which uses the uncertainty in the ground-truth data.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

The use of the terms "a" and "an" and "the" and similar referents in the context of this disclosure describing one or more aspects of the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter disclosed herein and does not pose a limitation on the scope of any invention derived from the disclosure unless otherwise claimed. No language in the specification should be construed as indicating any non-claimed element as essential.

It will be appreciated that the instant disclosure can be incorporated in the form of a variety of embodiments, only a few of which are disclosed herein. Variations of those embodiments may become apparent to those of ordinary skill in the art upon reading the foregoing description. Accordingly, this disclosure and any invention derived therefrom includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. An image processing method comprising:

obtaining an image captured by an image capture device and stored in a memory;

extracting one or more regions of interest in the obtained image;

normalizing the extracted one or more regions of interest to be at a predetermined scaling resolution;

generating a patch region having a predetermined size for each of the extracted one or more regions;

determining a stride size based on a size of the patch region and scale utilized during normalization;

moving the generated patch region according to the stride size to determine intensity values and frequency information in each of the one or more extracted regions;

extracting the frequency information of regions of interest;

determining a sharpness of the obtained image by aggregating the frequency information in each of the one or more extracted regions of interest; and labeling the obtained image with the determined sharpness score.

2. The image processing method of claim 1, further comprising selecting, for the generated patch, a ratio of frequencies in an X direction and a Y direction to identify a first region of the patch having lowest frequencies in both the X and Y direction to identify a second region of the patch having highest frequencies in just the X direction, just the Y direction and both the X and Y direction.

3. The image processing method according to claim 2, calculating one or more region scores using the frequency information in the first region, and one or more region scores using the frequency information in second region.

4. The image processing method according to claim 3, wherein the frequency information includes one or more of a mean value of frequency information and one or more of a maximum value of frequency information for each of the first region and the second region.

5. The image processing method according to claim 1 wherein generating the patch region further comprises using a plurality scales to obtain information from neighboring pixels for the generated patch such that each scale evaluates an increased number of neighboring pixels in the generated patch.

6. The image processing method according to claim 5, further comprising selecting a subset of scales from the plurality of scales; and obtaining frequency information about the image data from the pixels included in the selected subset of scales.

7. The image processing method according to claim 5, further comprising using the frequency information from each of the plurality of scales to predict sharpness of the obtained image.

8. An image processing apparatus comprising:

one or more memories storing instructions; and one or more processors that, in response to executing the stored instructions are configured to:

obtain an image captured by an image capture device and stored in a memory;

extract one or more regions of interest in the obtained image;

normalize the extracted one or more regions of interest to be at a predetermined scaling resolution;

generating a patch region having a predetermined size for each of the extracted one or more regions;

determining a stride size based on a size of the patch region and scale utilized during normalization;

moving the generated patch region according to the stride size to determine intensity values and frequency information in each of the one or more extracted regions;

extract the frequency information of regions of interest;

determine a sharpness of the obtained image by aggregating the frequency information in each of the one or more extracted regions of interest; and label the obtained image with the determined sharpness score.

9. The image processing apparatus of claim 8, wherein execution of the instructions further configures the one or more processors to select, for the generated patch, a ratio of frequencies in an X direction and a Y direction to identify a first region of the patch having lowest frequencies in both the X and Y direction to identify a second region of the patch having highest frequencies in just the X direction, just the Y direction and both the X and Y direction.

10. The image processing apparatus according to claim 8, wherein execution of the instructions further configures the one or more processors to calculate one or more region scores using the frequency information in the first region, and one or more region scores using the frequency information in second region.

11. The image processing apparatus according to claim 10, wherein the frequency information includes one or more of a mean value of frequency information and one or more of a maximum value of frequency information for each of the first region and the second region.

12. The image processing apparatus according to claim 8, wherein execution of the instructions further configures the one or more processors to generate the patch region using a plurality scales to obtain information from neighboring pixels for the generated patch such that each scale evaluates an increased number of neighboring pixels in the generated patch.

13. The image processing apparatus according to claim 12, wherein execution of the instructions further configures the one or more processors to select a subset of scales from the plurality of scales; and obtain frequency information about the image data from the pixels included in the selected subset of scales.

14. The image processing apparatus according to claim 12, wherein execution of the instructions further configures the one or more processors to use the frequency information from each of the plurality of scales to predict sharpness of the obtained image.

\* \* \* \* \*